Figure 1:
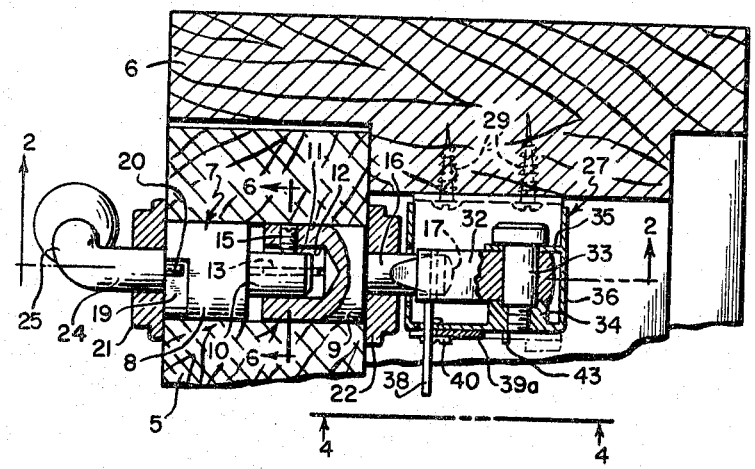

June 27, 1967  T. FERRANTE  3,328,063
AUTOMATIC LATCH DEVICE FOR CLOSURE DOORS
Filed Oct. 16, 1964

INVENTOR.
TONY FERRANTE
BY
ATTORNEY

United States Patent Office 3,328,063
Patented June 27, 1967

3,328,063
AUTOMATIC LATCH DEVICE FOR
CLOSURE DOORS
Tony Ferrante, 2217 Van Buren St.,
Hollywood, Fla. 33020
Filed Oct. 16, 1964, Ser. No. 404,314
4 Claims. (Cl. 292—136)

This invention relates to a latch device for closure doors or the like and with the latch device being carried by the closure door and having a shaft extending outwardly beyond the inner side of the door for hooking engagement with a hook that is disposed within a housing that is fixed to a jamb member.

The invention contemplates a latch device that is disposed within a cylindrical opening formed in the door and with the latch device embodying an adjustable barrel that is rotatable within the opening of the door and having an operating handle disposed upon the outer side of the door and connected with the barrel and with the barrel also carrying a cylindrical stem that is notched to engage a gravity operated hook that is vertically swingable in a housing fixed to the jamb of the door frame and with the hook carrying an actuating pin that extends outwardly through an arcuate slot formed in a front wall of the housing whereby the hook may be manually raised from its hooking engagement with respect to the stem and with the stem also being rotatable by the handle to disengage the stem from the hook from the outer side of the door.

The invention also contemplates the use of escutcheon plates upon the inner and outer side of the door to receive the handle and the stem and to prevent movement of the barrel out of the cylindrical opening and with the plate upon the outer side of the door being provided with a pin that engages within an arcuate slot formed in the barrel and whereby to prevent the handle from being moved to a vertical position and to maintain the handle in a position whereby it will fall by gravity to dispose a notch within the stem in an upright manner to engage the hook within the housing and with the stem being rounded upon its terminal end to underride a nose of the hook.

A further object of the invention resides in a housing that is fixed to the side of the jamb member of the door frame and carrying therein a latch hook and with an outer wall of the housing being provided with a pivoted handle that is notched to override the pin upon the hook for maintaining the hook in active latching engagement against unlatching from the handle on the outside of the door and in another position, the handle, with the pin in the uppermost position again underlying the pin to maintain the hook in a raised position against latching.

Novel features of construction and arrangement of parts will be more clearly apparent during the course of the following description, reference being had to the accompanying drawings wherein has been illustrated a preferred form of the device and wherein like characters of reference are employed to denote like parts therein.

Figure 4:
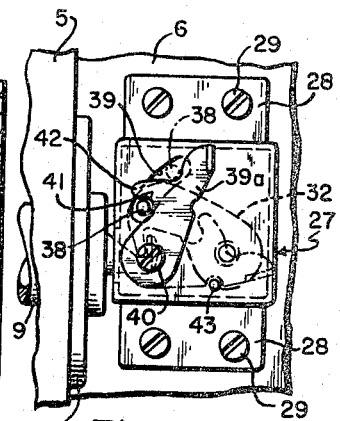
Figure 2:
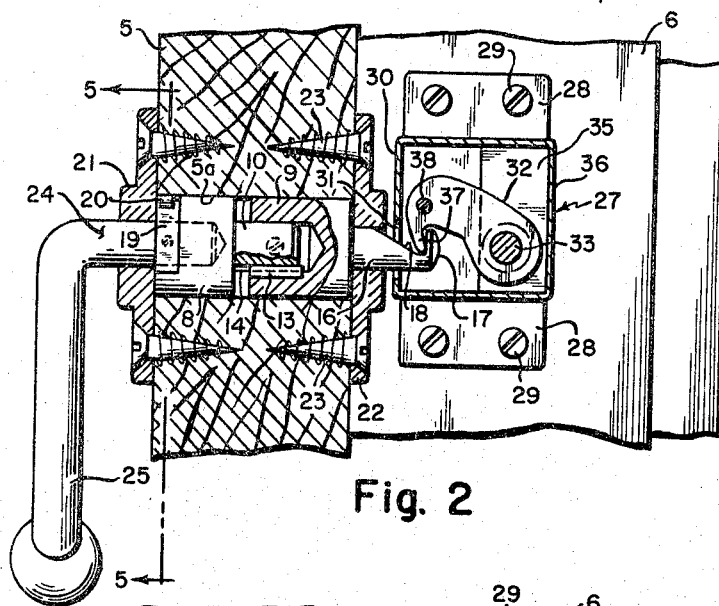
Figure 5:
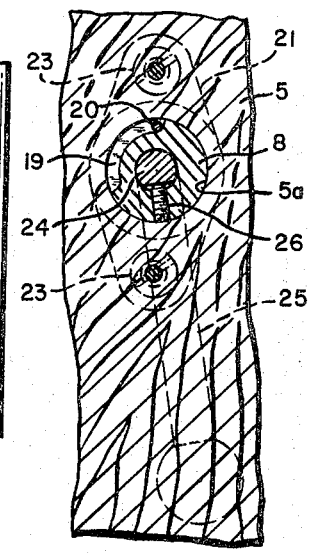
Figure 3:
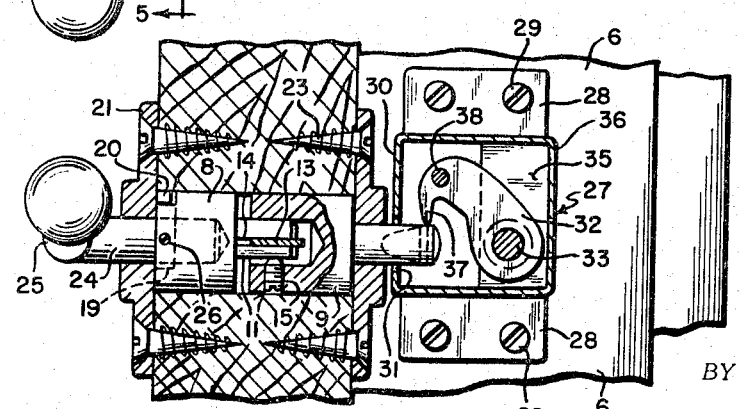
Figure 6:
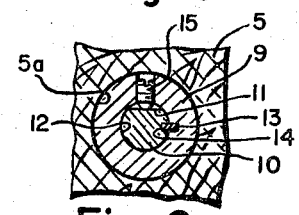

In the drawings:

FIGURE 1 is a horizontal sectional view taken through the latch mechanism, parts being shown in elevation, FIGURE 2 is a section taken substantially on line 2—2 of FIGURE 1, parts being shown in elevation, FIGURE 3 is a view similar to FIGURE 2 but showing the latch mechanism in the disengaged position, FIGURE 4 is a front elevational view of a housing carrying certain parts of the latch mechanism and looking in the direction of the line 4—4 of FIGURE 1, FIGURE 5 is a vertical sectional view taken substantially on line 5—5 of FIGURE 2, and FIGURE 6 is a sectional view taken on line 6—6 of FIGURE 1.

Referring specifically to the drawings, there has been illustrated the conventional closure door 5, that is hinged in the usual manner and adapted to engage a jamb member 6, as is customary. Fitted within the door 5 is a cylindrical barrel, indicated as a whole by the numeral 7. The barrel embodies outer and inner cylindrical sections 8 and 9. The barrel section 8 carries a stem 10, that is flattened upon one side as illustrated at 11 and the stem 10 has fitment into a cylindrical recess 12 in the barrel section 9 and is guided and held against turning by a key 13, engaging a key slot 14 in the stem 10. The barrel is therefore adjustable for doors of varying thicknesses and after adjustment with respect to a particular width of door, the stem 10 is fixed against sliding movement by a set screw 15. The barrel section 9 carries a latch stem 16 that is rounded at its outer end as indicated at 17 and the stem 16 is notched as indicated at 18 for engagement with a latch hook, to be described. The barrel section 8 upon its end opposite to the stem 10 with an arcuate slot 19, receiving a limit pin 20 carried by an outer escutcheon plate 21. Upon the inner side a similar escutcheon plate 22 is connected to the door by screws 23 for holding the barrel against disengagement from the door. The escutcheon plates 21 and 22 are apertured to receive the stem 16 that projects beyond the inner side of the door and the apertures of the outer escutcheon plate 21 is apertured to receive an end portion 24 of an operating handle 25. The end 24 of the operating handle 25 has fitment within a recess formed in the barrel member 8 and is held against turning by a set screw 26.

Fixed to the face of the jamb 6, is a generally square housing 27. The housing is provided with upper and lower wings 28 that lie flat against the jamb 6 and receive fastening screws 29. One side of the housing indicated at 30 is provided with a cylindrical opening 31 that is disposed in axial alignment with the stem 16 and in operation, the stem extends into the housing through the opening 31 when the door is closed. Pivoted within the housing 27 is a latch hook 32, rockable upon a shaft 33 that is journaled at one end within a lug 34, carried by the front wall of the housing and a relatively thin partition 35 formed integral with the opposite side wall 36 of the housing. The shaft 33 may either be a rivet or a threaded screw. The hook 32 carries a hooked end 37 that is adapted to engage the rounded end of the stem 16 at engagement to raise the hook upwardly upon the shaft 33 to a position where the hook engages within the notch 18 of the stem 16. The hook 32 is thus free to rise and fall. The hook 32 also carries a pin 38 that projects laterally and forwardly through the front wall of the housing and through an arcuate slot 39 and the pin 38 projects a substantial distance beyond the face of the housing and constitutes a manual operating means for the hook 32. The slot 39 is on an arc taken from the axial center line of the shaft 33.

Means are provided to retain the pin 38 and the hook 32 in either a positive locked position or a positive unlocked position and for this purpose, there has been provided a manually-operated handle 39a that is pivoted to the outer wall of the housing, as at 40 to swing toward and from the pin 38. The handle 39a is provided with an undercut notch as indicated at 41 to either engage over the pin 38 with a snap action for retaining the mechanism in the locked position, or, if the latch is to be inactivated, the pin 38 is swung upwardly in the slot 39, lifting the hook 32 in an upward position and out of the path of movement of the stem 16 and with the handle 39a and its notch 41 providing a tongue 42 that either hooks over the pin 38 or under the pin 38 depending on which position the hook 32 is placed.

It should be here stated that the device as described may be cast or molded from any suitable metal, such as aluminum or possibly plastic and that the mechanism may be constructed for both right and left hand assemblies.

In the use of the device, the door is first bored to form a cylindrical opening 5a. It first being determined the thickness of the door, the parts are assembled by engaging the handle member 24 through the opening in the outer escutcheon plate 21 to engage the recess within the member 8 and with the pin 20 engaging within the slot 19. The set screw 26 is in position after which the second complementary barrel member 9 is engaged over the stem 10 and separated according to the thickness of the door and the set screw 15 then fixed to prevent turning movement or shifting movement of the members when so assembled. The barrel is then inserted within the bore opening 5a and the escutcheon plates fixed to the inner and outer sides by the screws 23. The housing 27 is then fixed to the jamb member so that its opening 31 is in accurate alignment with the stem 16 and fixed by the screws 29. The housing and its associated elements have previously been assembled by installing the hook 32 upon the shaft 33 and the pin 38 extending through the arcuate slot 39 in the front wall of the housing. When the handle 39a is not to be used, it is manually swung downwardly to the dotted line position shown in FIGURE 4 and is limited in such swinging movement by a pin 43. The device is now in a position for latching engagement when the door is closed and, when the stem 16 is swung through the opening 31, it is rounded and raises the hook 32 and then drops the nose of the hook into the notch 18, securely holding the door against outward movement. If the operator on the inside wishes to open the door, he merely raises the hook 32 by the pin 38, releasing its engagement with the stem 16 if the latch is to be released from the outside, by the handle 25, the operator swings the handle upwardly, moving the stem 16 to rotate and in such rotation, the hook rides out of the notch 18, shown particularly in FIGURE 3 and when the door is open, the hook 32 drops by gravity to again be positioned for receiving the stem 16. If the device is to be held in a latched position, such as shown in FIGURE 2, the operator swings the handle upwardly to have its undercut notch 41 sprung over the pin 38 and securely hold the stem 16 in latched engagement with the hook 32. If the latch is to be deactivated against latching engagement, the operator raises the pin 38, swinging the hook 32 upwardly out of engagement with the stem 16 and the lip of the handle will then underlie the pin 38, permitting the door to be swung inwardly and outwardly without having hooked engagement.

It will be apparent from the foregoing that a very novel and effective latch device has been provided that is simple, is strong, cheap to manufacture and provides a very definite latch for retaining the closure door in latched engagement with the housing mechanism carrying the hook 32.

It is to be understood that the invention is not limited to the precise construction shown, but that changes are contemplated as readily fall within the spirit of the invention as shall be determined by the scope of the subjoined claims.

I claim:

1. A latch device for closure doors and in combination with a jamb member, the latch device including an adjustable cylindrical barrel that is rotatively mounted in a cylindrical opening through a door, an outer operating handle fixed to one end of the barrel and with the opposite end of the barrel having an extended stem portion that is notched at its end, escutcheon plates fixed upon the inner and outer sides of the door to prevent axial movement of the barrel and with the escutcheon plates being apertured to rotatably receive an end portion of the handle and the stem, a housing fixed to the face of a jamb member against which the door has abutting engagement, the housing having a side wall provided with an opening for the passage of the notched end of the stem, a shaft in the housing supporting a hook member, the hook member being freely mounted upon the shaft to rise and fall under the influence of the stem to permit the engagement of the hook into the notch of the stem, the hook being vertically movable, the hook being provided with a lateral pin that extends through an arcuate opening in a front wall of the housing and projects beyond the housing for manually raising the hook out of engagement with the notch of the stem and means pivoted upon the outer face of the housing to engage the pin and to maintain the pin against release of the hook or to engage the pin to maintain the hook out of alignment with the stem.

2. A latch device for closure doors that are adapted to engage a jamb member, the latch device embodying a cylindrical two-part barrel that has fitment into a cylindrical opening extending completely through the door, an operating handle for the barrel disposed upon the outer side of the door and provided with a right angle portion that extends through a cylindrical opening in an outer escutcheon plate and has fixed engagement within an opening of the barrel, an opposite end of the barrel being provided with a cylindrical stem portion that extends inwardly from the door and is also rotatable in a cylindrical opening of an inner escutcheon plate, the stem being rounded at its free end and provided with a notch that is normally upwardly opening, means carried by the outer escutcheon plate and engaging an adjacent end of the barrel to limit the rotative movement of the barrel to dispose the notch of the stem to direct it either upwardly or to one side, a housing fixed upon a face of the jamb member and with the housing having an opening upon one side for the passage of the stem when the door is in the fully closed position, a shaft fixed within the housing and extending from a front wall of the housing to a partition in the housing, a hook device freely rotatable upon the shaft and with the free end of the hook adapted to engage the notch of the stem in the latch position and to be disengaged from the notch when the barrel is rotated to dispose the notch at a right angle for releasing the hook, the hook upon one side having a laterally extending operating pin that projects through an arcuate slot forward in a front wall of the housing and limiting the downward movement of the hook when disengaged from the stem upon the opening of the door and also limiting the manual operation of the hook to release the hook from the stem from the inner side of the door and a notched handle that is pivoted upon the outer face of the housing to swing toward and from the pin, the said handle engaging the pin in the locked position of the hook to retain the hook in the latched position with the notch of the stem against movement by the first named handle from the outer side of the door, the said second named handle also adapted to engage beneath the pin to retain the hook in a disengaged position with respect to the stem and to permit the opening for closing of the door freely without latched engagement with the hook.

3. The structure according to claim 2 wherein the barrel comprises two cylindrical portions that are adjustable in accordance with the thickness of the door, one portion of the barrel being provided with a cylindrical stud that is engageable in a cylindrical opening of the other barrel member and with the stud having key engagement into the other of the said members to prevent relative rotation of the barrel members and a set screw passing through the second barrel member to engage the stud and to fix the members against axial movement with respect to each other.

4. The structure according to claim 3 wherein an operating handle is disposed upon the outer side of the door and with the operating handle having a right angle end portion that is seated within a recess of the first barrel portion and fixed therein by a set screw, the handle at its free end being provided with a spherical knob, escutcheon plates fixed upon the inner and outer sides of the door and overlying the opening of the door and to retain the barrel members against axial movement, the escutcheon plates being cylindrically apertured to receive the right angle portion of the handle and to rotatably receive the stem portion that extends inwardly of the door, the first barrel member being arcuately slotted upon its outer end to receive a pin that is carried by the outer escutcheon plate and whereby to limit the rotative movement of the barrel and to prevent the handle from being disposed in an upper position and to permit the handle to freely drop downwardly to maintain the barrel and the stem in a latching position with respect to the hook.

References Cited

UNITED STATES PATENTS

| 1,015,338 | 1/1912 | Peel | 292—57 |
| 2,575,972 | 11/1951 | Nelson | 292—238 |
| 2,793,062 | 5/1957 | Fleming | 292—57 |

FOREIGN PATENTS

| 266,964 | 3/1927 | Great Britain. |

MARVIN A. CHAMPION, *Primary Examiner.*

EDWARD C. ALLEN, *Examiner.*

J. R. MOSES, *Assistant Examiner.*